United States Patent
Siegl

(10) Patent No.: US 10,689,144 B2
(45) Date of Patent: Jun. 23, 2020

(54) PLASTIC CONTAINER WITH A CUT NECK PRODUCED IN A STRETCH BLOW-MOLDING METHOD

(71) Applicant: ALPLA WERKE ALWIN LEHNER GMBH & CO. KG, Hard (AT)

(72) Inventor: Robert Siegl, Dornbirn (AT)

(73) Assignee: ALPLA WERKE ALWIN LEHNER GMBH 8: CO. KG, Hard (AT)

( * ) Notice: Subject to any disclaimer, the term of this patent is extended or adjusted under 35 U.S.C. 154(b) by 553 days.

(21) Appl. No.: 14/084,057

(22) Filed: Nov. 19, 2013

(65) Prior Publication Data

US 2014/0076838 A1 Mar. 20, 2014

Related U.S. Application Data

(63) Continuation of application No. PCT/EP2012/002008, filed on May 10, 2012.

(30) Foreign Application Priority Data

May 19, 2011 (CH) ........................................ 0852/11

(51) Int. Cl.
*B65D 1/02* (2006.01)
*B29C 49/06* (2006.01)
(Continued)

(52) U.S. Cl.
CPC ............ *B65D 1/0246* (2013.01); *B29C 49/06* (2013.01); *B29D 22/003* (2013.01); *B65D 1/023* (2013.01);
(Continued)

(58) Field of Classification Search
CPC .. B65D 23/06; B65D 23/0821; B65D 1/0246; B65D 1/023; B65D 1/16; B29C 49/06;
(Continued)

(56) References Cited

U.S. PATENT DOCUMENTS 3,392,861 A * 7/1968 Dimmitt ................. B29C 49/74
215/307
3,403,804 A * 10/1968 Colombo ............. B65D 1/0276
215/375

(Continued)

OTHER PUBLICATIONS

International Preliminary Report on Patentability (Form PCT/IB/373) and the Written Opinion of the International Searching Authority (Form PCT/ISA/237) dated Nov. 19, 2013, by the International Bureau of WIPO in corresponding International Application No. PCT/EP2012/002008. (5 pages).

(Continued)

*Primary Examiner* — J. Gregory Pickett
*Assistant Examiner* — Niki M Eloshway
(74) *Attorney, Agent, or Firm* — Buchanan Ingersoll & Rooney PC

(57) ABSTRACT

A plastic container with a cut neck is disclosed, which is produced by stretch blow-molding from a preform manufactured by plastic injection or plastic flow molding, and which immediately following production, or separated in space and/or time, is inserted into a mold cavity of a blow-mold tool of a stretch blow-molding device and with the aid of a blow-molding medium inflated and stretched according to the mold cavity. The preform is then shaped to form the desired plastic container by cutting off an excess section that includes an injection-molded neck part of the preform.

22 Claims, 2 Drawing Sheets

(51) Int. Cl.
*B65D 1/16* (2006.01)
*B29D 22/00* (2006.01)
B65D 23/00 (2006.01)
B29L 31/00 (2006.01)
B29C 49/02 (2006.01)
B29C 49/12 (2006.01)

(52) U.S. Cl.
CPC ............... *B65D 1/16* (2013.01); *B29C 49/12* (2013.01); *B29C 2049/028* (2013.01); *B29C 2793/009* (2013.01); *B29L 2031/716* (2013.01)

(58) Field of Classification Search
CPC .............. B29C 49/12; B29C 2049/028; B29C 2793/009; B29D 22/003; B29L 2031/716
USPC .................. 215/12.2, 41, 42, 43, 45, 44
See application file for complete search history.

(56) References Cited

U.S. PATENT DOCUMENTS

| | | | | |
|---|---|---|---|---|
| 3,899,278 A * | 8/1975 | Fead | ........................ | B29C 49/50 215/44 |
| 4,497,623 A * | 2/1985 | Beuscher | ................ | B29C 49/76 264/533 |
| 4,699,285 A * | 10/1987 | Perne | ................. | B65D 41/3409 215/252 |
| 4,823,967 A * | 4/1989 | Thompson | ......... | B65D 41/0414 215/222 |
| 5,373,955 A * | 12/1994 | Marino | ................ | B65D 41/465 215/253 |
| 5,964,362 A * | 10/1999 | Sandor | .................... | B29C 49/58 215/344 |
| 6,228,317 B1 | 5/2001 | Smith et al. | | |
| 6,237,791 B1 | 5/2001 | Beck et al. | | |
| 6,241,111 B1 * | 6/2001 | Sandor | .................... | B29C 49/50 215/252 |
| 6,260,722 B1 * | 7/2001 | Ekkert | ............... | B65D 41/0471 215/331 |
| 6,536,616 B2 * | 3/2003 | Sandor | ............... | B65D 41/3409 215/256 |
| 6,555,191 B1 | 4/2003 | Smith et al. | | |
| 6,981,603 B1 * | 1/2006 | Mengeu | ............. | B65D 41/0414 215/329 |
| 8,551,589 B2 * | 10/2013 | Hutchinson | ............. | B29C 44/04 215/12.2 |
| 2004/0121097 A1 | 6/2004 | Nahill et al. | | |
| 2005/0048235 A1 | 3/2005 | Dygert | | |
| 2007/0051688 A1 | 3/2007 | Dygert et al. | | |
| 2007/0059462 A1 | 3/2007 | Nahill et al. | | |
| 2012/0308841 A1 * | 12/2012 | Witz | .................. | B29C 49/0073 428/542.8 |

OTHER PUBLICATIONS

*International Search Report (PCT/ISA/210) dated Jun. 12, 2012, by the European Patent Office as the International Searching Authority for International Application No. PCT/EP2012/002008.

*Written Opinion (PCT/ISA/237) dated Jun. 12, 2012, by the European Patent Office as the International Searching Authority for International Application No. PCT/EP2012/002008.

* cited by examiner

PLASTIC CONTAINER WITH A CUT NECK PRODUCED IN A STRETCH BLOW-MOLDING METHOD

RELATED APPLICATION

This application claims priority as a continuation application under 35 U.S.C. § 120 to PCT/EP2012/002008, which was filed as an International Application on May 10, 2012 designating the U.S., and which claims priority to Swiss Application 00852/11 filed in Switzerland on May 19, 2011. The entire contents of these applications are hereby incorporated by reference in their entireties.

FIELD

The disclosure relates to a plastic container with a cut neck, produced in a stretch blow-molding method.

BACKGROUND INFORMATION

A large number of plastic containers that are now used, for example, plastic bottles and the like, are produced using a stretch blow-molding method. In the stretch blow-molding method, a so-called preform, which can have a tubelike shape, has a bottom on its one longitudinal end and a neck area with formed threaded sections or the like on its other longitudinal end, is inserted into a mold cavity of a blow mold, and is inflated by a medium that is injected with overpressure. Here, the preform is additionally stretched in the axial direction with a stretching mandrel that is inserted through the neck opening. After this blow-molding and stretching process, the finished, stretch-hardened plastic container is demolded, or removed, from the blow mold.

A raw material that has been used for the production of plastic containers in the stretch blow-molding method is polyethylene terephthalate (PET). As a result of the extensive stretching done in the stretch blow-molding method, PET has very good mechanical strength values. For example, in the stretch blow-molding method of PET, a total stretching factor of up to 20 can be reached. In contrast, polyolefins, such as polyethylene (PE) or polypropylene (PP), which have been processed in an extrusion blow-molding method, have a total stretching factor of mostly less than 5. Extrusion-blow-molded plastic containers therefore have lower mechanical strength values compared to stretch-blow-molded PET containers and for that reason are not internal-pressure-resistant for example. Carbon-dioxide-enriched liquids are therefore not stored in extrusion-blow-molded plastic containers.

For certain applications of PET containers, for example in the area of detergents, the containers can have necks with very large inside diameters, for example 30 mm to 150 mm. The use of special preforms, which can be produced in a plastic injection method, for example in an injection-molding method, can entail very high costs. This results from the fact that for the production of preforms with large opening diameters or neck widths, very high closing forces are involved to keep the injection tool closed.

For this purpose, either very large and expensive injection-molding machines are involved, or a number of smaller injection-molding machines with only a few injection cavities are used. The production costs for preforms with large opening diameters are therefore also high, since the opening diameters are generally not standardized. This means that for each new project, a new special preform is used, for whose production a new injection-molding mold is built.

In the production of preforms in an injection-molding method, the value of the wall thickness of the preform should not drop below, for example, 1 mm; in some units, the minimum wall thickness of the preform is even at least 2 mm. As a result, a large amount of material is used for example for the neck area of the preform. This increases the costs and results in an unnecessarily large use of material, which is also undesirable for ecological reasons.

Plastic containers with large opening diameters or large neck widths cause can however create issues for known stretch blow-molding methods. Standard stretch blow-molding devices have been designed for preforms with opening widths of 28 mm to 48 mm. For the processing of preforms with opening widths of more than 48 mm and greater, special stretch blow-molding devices are used.

To remedy these issues and to make possible a more economical production of plastic containers with large opening diameters, stretch-blow-molded plastic containers that have a cut neck have been established. Such plastic containers are produced from known preforms with standardized smaller opening diameters, as are used for the production of soft drink or water bottles, and the like. In the stretch blow-molding method, containers with a so-called dome, which is cut off from the respective plastic container after the stretch blow-molding process, are blow-molded from these known preforms.

The dome is located below the neck fixed for the preform in the injection-molding method. It has a considerably larger diameter than the preform neck and connects to the body of the container. The wide neck with the larger inside diameter is thus defined by the blow-molding process.

In this case, the outside contours, for example threaded sections or the like, are also defined on the neck of the plastic container that is later cut. This also allows the position of the outside threaded section or the same connection devices to be specified very precisely for the assembly of complex closure systems. The alignment tolerance for such special closure systems is often, for example, ±1° to ±3°. In the production method in the one- or two-stage stretch blow-molding method, the desired precision of the orientation of the threaded sections or such connection devices therefore can warrant use of a special heating technology of the preform and an exact orientation of the preform during insertion into the blow mold tool, which can further increase the effort for the production of the plastic container.

The quality of the cut neck, for example of the cut periphery, can be relatively poor. As a result, with stretch-blow-molded plastic containers with cut necks of the state of the art, an increased effort for the sealing of the neck opening should be taken into account. One way of sealing these containers, which can also have a can-like shape, and are equipped with lids, includes sealing inductively or conductively. This method can be expensive and involve relatively large investments in equipment.

Alternative sealing systems provide an arrangement in with a closure which is, for example, screwed on, with a soft closure insert made from an elastomer or from a foam material or the like. The sealing of the neck is then carried out by the pressing of the elastically deformable closure insert on the cut periphery of the cut neck. These additional closure inserts, however, can be incompatible with recycling specifications with respect to the use of raw materials that are as few and as uniform as possible, or they involve special, expensive separating steps during recycling.

From the state of the art, closure systems in which the irregularly cut periphery of the container neck is encompassed by a metal lid are also known. This closure variant can also be comparatively expensive, and not very desirable from the standpoint of recycling because of the different materials.

SUMMARY

A plastic container is disclosed, comprising: a neck produced from a plastic preform via a mold cavity of a blow-mold tool of a stretch blow-molding device with a stretch mandrel used to form the plastic container; and a cut periphery of the neck, beneath which is an encircling, essentially radially tapered portion that encircles an outside wall of the plastic container and, on an opposing inside wall, forms a substantially radially encircling step, which step is configured for interaction with a sealing cone, which projects from a closure part, when mounted on the cut periphery of the plastic container.

A method is disclosed for producing a plastic container, the method comprising: forming a preform via plastic injection or plastic flow molding; inserting the preform into a mold cavity of a blow-mold tool of a stretch blow-molding device, and with a blow-molding medium, inflating the preform by overpressure and stretching the preform with a stretch mandrel according to the mold cavity, to form the plastic container; removing the plastic container from the mold cavity; and cutting off an excess section that includes an injection-molded neck part of the preform, wherein a neck of the stretch-blow-molded plastic container that remains after the cutting, beneath a cut periphery, has an encircling, essentially radially tapered portion that encircles an outside wall of the plastic container and, on an opposing inside wall, forms a substantially radially encircling step, which step is configured for interaction with a sealing cone, which projects from a closure part, when mounted on the neck of the plastic container.

BRIEF DESCRIPTION OF THE DRAWINGS

Other advantages will be apparent from the following description of exemplary embodiments of the disclosure, with reference to the diagrammatic drawings presented in sectioned views that are not to scale. In the diagrammatic views, the same elements in each case bear the same reference numbers, wherein.

DETAILED DESCRIPTION

Figures 1A, 1B:
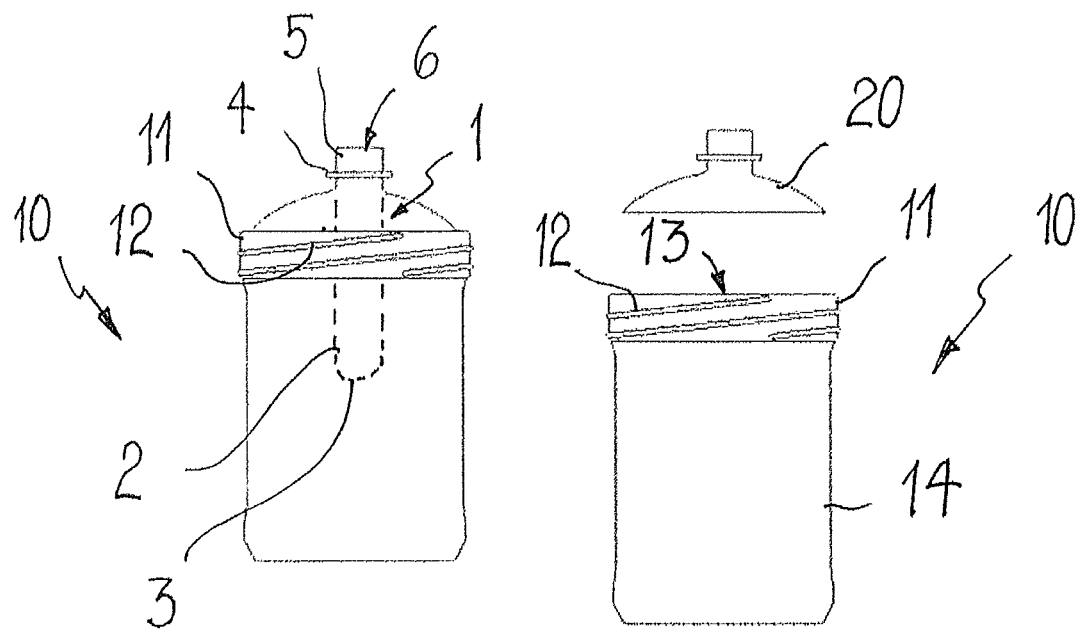
FIGS. 1a and 1b show two schematic views for explaining exemplary production of a stretch-blow-molded plastic container with a cut neck according to an exemplary embodiment of the disclosure.

A modified stretch-blow-molded plastic container is disclosed with a cut neck that can be tightly sealed even without expensive sealing steps. Deformable closure inserts that include other raw materials than the plastic material used for the plastic container can be eliminated. The plastic container is suitable, for example, for closure systems with inner cones. At the same time, an exemplary stretch-blow-molded plastic container with a cut neck as disclosed herein can be simple and economical in production.

As disclosed herein, a plastic container with a cut neck is produced in a stretch blow-molding method wherein stretching is performed with a stretching mandrel. The container is molded from a preform that has been manufactured in a plastic injection method or a plastic flow molding method and that immediately following its production, or separated in space and/or time, has been inserted into a mold cavity of a blow-mold tool of a stretch blow-molding device and has been inflated according to the mold cavity by overpressure with the aid of a blow-molding medium, and then has been shaped to form the desired plastic container by cutting off an excess section that includes an injection-molded neck part of the preform. A neck of the stretch-blow-molded plastic container that remains after the cutting has, beneath the cut periphery, a tapered portion that encircles essentially radially on the outer wall, and on an opposite inner wall, as a substantially radially encircling step. The step is designed for interacting with a sealing cone, which projects from a closure part that can be mounted on the cut neck of the plastic container.

An exemplary plastic container according to the disclosure can be produced according to stretch blow-molding methods sufficiently known from the state of the art. In this case, a one-stage stretch blow-molding method can be used in which a preform produced in a plastic injection method or in a plastic flow molding method is inserted immediately after its production into the blow-mold tool of a stretch blow-molding device and is inflated, stretched there according to the mold cavity and demolded. It can also, however, be produced in for example a two-stage stretch blow-molding method, in which the previously manufactured preform is inflated and stretched in a stretch blow-molding device, separated in time and/or space. The plastic container is blow-molded with a so-called dome, on which the neck section of the container is fixed.

An excess section of the plastic container, which includes a neck portion of the preform, is cut off after the demolding. The remaining cut neck of the plastic container has a considerably larger opening diameter on the cut periphery than the original preform.

The encircling step that projects below the cut periphery on the inside wall of the neck section can be used for sealing with a sealing cone, which projects from a closure part that can be mounted on the cut neck.

Since the sealing is now carried out within the cut neck, the quality of the cut periphery of the cut neck no longer plays any role. Special sealing inserts on the closure part, which can be elastically deformed in the assembly on the neck edge and compensate for irregularities of the cut edge, can be eliminated. The design of the encircling step on the inside wall of the cut neck allows the use of closure parts with a projecting sealing cone designed in a standard way.

The production of the plastic container can be carried out from a very simple preform, as it is sufficiently known from the manufacturing of water bottles or soft drink bottles. The encircling step on the inside wall of the neck section of the plastic container is, for example, only produced in the stretch blow-molding method. This makes it possible to design as desired the dimensions of the encircling step. Exemplary containers according to the disclosure can be produced simply and economically.

The radially encircling step on the inside wall is formed by a corresponding encircling tapered portion on the outside wall of the cut neck. The latter has an axial distance from the cut periphery of the cut neck that is, for example, approximately (e.g., plus/minus 10 percent) 1 mm to approximately 10 mm. This distance ensures that closure elements can be used whose downward projecting sealing cone has an axial length known from the state of the art, and no expensive special production processes need be involved.

The encircling step can have a radially projecting length relative to the inside wall of the cutaway neck, which is, for example, approximately 0.2 mm to approximately 4 mm. This radially projecting length of the encircling step ensures a large enough preload force relative to the sealing cone to guarantee the sealing of the closure element.

In an exemplary variant embodiment of the disclosure, the encircling tapered portion extends axially over the entire length of the cut neck. In an alternative exemplary variant embodiment of the disclosure, the encircling tapered portion can be configured as a circumferential groove in the outside wall, whereby the groove forms a sealing bead on the inside wall.

The circumferential groove on the outside wall can be a chamfer. It can also have, however, a larger axial expansion. An axial length of the groove, measured on the outside wall of for example, approximately 0.2 mm to 10 mm can be suitable for the sealing interaction with the sealing cone of a closure element.

An exemplary plastic container according to the disclosure with an encircling step on the inside wall of the cut neck or with a circumferential sealing bead can be suitable in plastic containers that have an inside diameter on the cutting periphery of the neck section that is larger than for example, 48 mm but does not exceed for example 150 mm. For plastic containers with smaller neck diameters, preforms produced in a plastic injection method or in a plastic flow molding method can be available, which can be produced very economically in terms of mass industry. The units and tools that can be used for this purpose can be readily obtained, and in many cases can be part of the standard equipment of manufacturers of plastic containers.

As an exemplary alternative, enough providers of preforms with smaller neck diameters also exist, from whom these preforms can be ordered economically. Such preforms can be already provided with a circumferential bead projecting on the inside wall of the preform neck. The dimensions of this circumferential sealing bead, produced for example with a plastic injection method, such as an injection-molding method, can be often limited, however, by the demoldability of the preform from the injection molding tool. Also, the circumferential sealing bead produced in the injection-molding method in the subsequent stretch blow-molding method can undergo a certain deformation, by which the sealing interaction of the circumferential sealing bead with the sealing cone of a closure element can be impaired.

Since an exemplary plastic container according to the disclosure can have an encircling step or a circumferential bead on the inside wall of its cut neck, which allows a sealing on the inside wall of the neck, the possibility exists of designing the cutting periphery of the cut neck in accordance with the specifications of the consumer.

In an exemplary variant embodiment of the disclosure, the edge of the cutaway neck therefore can have a radius of curvature (r) that is less than for example 0.2 mm. When the contents can be poured out, this sharp-edged design of the cutting periphery edge can ensure the "cutting-off" of the last drop and thus forms a so-called "dropless lip."

The cutting periphery of the cut neck in this case can be cut in such a way that it has a beveling extending inwardly from the cutting edge. The cutting can be conducted, however, such that the beveling extends outwardly from the cutting periphery.

In an alternative exemplary variant embodiment of a plastic container according to the disclosure, the cutting periphery of the cut neck can have a radius of curvature (r) that is larger than for example 0.2 mm but smaller than for example 1.5 mm. Cutting peripheries with larger radii of curvature meet higher safety specifications when, for example, it can be assumed that the contents of the container can be enjoyed directly from the latter. Here, the larger radius of curvature can provide for a better feel when the bottle edge comes into contact with the mouth.

An exemplary plastic container that is designed according to the disclosure is, because of its inner seal for example re-closeable. This makes possible the production of plastic containers for which, up to now, glass has been the preferred material. Examples of such uses can be the storage of instant coffee, instant cocoa, instant tea, pickled gherkins or cocktail gherkins, cooking vegetables, and the like, mayonnaise, ketchup, breakfast spreads, spaghetti sauces, sauces of all types, mustard, horseradish, etc. For use as a glass replacement, it can be advantageous when the cut neck section has a wall thickness of for example approximately 0.6 mm to 1.8 mm.

For the mounting of a closure part or for the assembly of a complex closure system, an exemplary plastic container according to the disclosure can be equipped on the outside wall of its cut neck with a threading, with threaded sections, or like positive projecting protrusions or recesses that can be shaped in the stretch blow-molding method.

The production of the connecting elements in the stretch blow-molding method allows the preform to be inserted without orientation into the blow mold tool. The exact orientation of the connecting elements can be defined by the mold cavity. In this manner, the often desired high orientation accuracy of, for example, $\pm 1°$ to $\pm 3°$ can be achieved without greater expense.

Depending on the specifications of the plastic container, the latter can be designed in one or more layers.

At the same time, it can prove advantageous for strength properties of the plastic container when at least one layer includes (e.g., consists of) plastic or a plastic mixture of the group that consists of polyesters, polyolefins, polyamides, polystyrenes, polylactides and polyamides, for example PET, PE, PP, PEN, PVC, PVDC, and PLA.

For the production of the preform in a plastic injection method or in a plastic flow molding method and for the subsequent forming of the plastic container from the preform in a subsequent stretch blow-molding method, at least one layer can include (e.g., consist of) mono-, bi- or polymodal HDPE or polypropylene.

For many applications of the plastic container, for example for the use in the food sector, it can prove advantageous if it is designed in multiple layers and has at least one layer with barrier additives, for example oxygen traps, nanoclays, or UV blockers and/or a slide coating and/or a residual discard coating.

For ecological reasons, an exemplary plastic container according to the disclosure can include (e.g., consist of) up to 100% recycled plastic material.

A plastic container, designed according to the disclosure, with a large neck diameter can be suitable for example for storing viscous contents, such as viscous food. The encircling step or the circumferential bead on the inside wall of the neck section allows a reliable sealing, by which the plastic container, for example, can be also suitable for storing yogurt, jams, etc., which can be removed directly from the container with a spoon.

The schematic view in FIG. 1a shows an exemplary plastic container, referred to overall with the reference number 10, which has been shaped in a stretch blow-molding method from a preform designed with respect to a standard and produced in a plastic injection method or in a plastic flow molding method, and which is indicated in broken lines in the depiction and is designated overall with the reference number 1.

Such preforms 1 are known from the state of the art. They can have an elongated body 2 that is designed essentially cylindrical or slightly conical. On its longitudinal end, the body 2 of the preform 1 is closed with a bottom 3. A neck part 5, which is provided with an opening 6, whose diameter is, for example, approximately (e.g., plus/minus 10 percent) 28 mm to 30 mm, is connected to the other longitudinal end of the body 2 of the preform 1. The neck part 5 is separated by a transfer ring 4 from the body 2 of the preform 1.

The preform 1 is inserted in a blow mold tool of a stretch blow-molding device and inflated there according to a mold cavity, which is enclosed by the blow mold tool, by a blow-molding medium which is injected with overpressure, such as air, and at the same time is elongated or stretched with a stretching mandrel.

For the production of a plastic container 10 with an opening diameter that is larger than for example 48 mm and can be, for example, up to 150 mm or greater, the preform 1 is inflated, and expanded like a dome, below the transfer ring 4. In the same process step the neck 11 of the plastic container can be shaped, on which neck threaded turns 12 or threaded sections of an outside threading or like positive connecting elements can be made. The threaded turns 12 or threaded sections or the like can be defined by the mold cavity. Therefore, they can be formed with very high orientation accuracy without the preform 1 having to be inserted into the blow-mold tool of the stretch blow-molding device in an aligned manner. As is known in stretch blow-molding methods, the transfer ring 4 and the neck part 5 of the preform 1 also remain unaltered after the inflating and stretching of the preform body 2, their shape having been defined in the plastic injection method.

FIG. 1b shows the stretch-blow-molded plastic container 10 after the domelike inflated section 20, on which the unaltered transfer ring and the unaltered neck part of the preform can still be seen, has been separated. By the separation of the domelike inflated section 20, the stretch-blow-molded plastic container obtains a neck opening 13 whose diameter is considerably larger than that of the opening of the preform. The diameter of the opening 13 of the cutaway neck 11 is for example larger than 48 mm and can be for example up to 150 mm or greater.

The threaded sections formed on the cutaway neck 11 in the stretch blow-molding method can be again designated with the reference number 12. For example, cylindrical body of the stretch-blow-molded plastic container bears the reference number 14.

Figure 2:
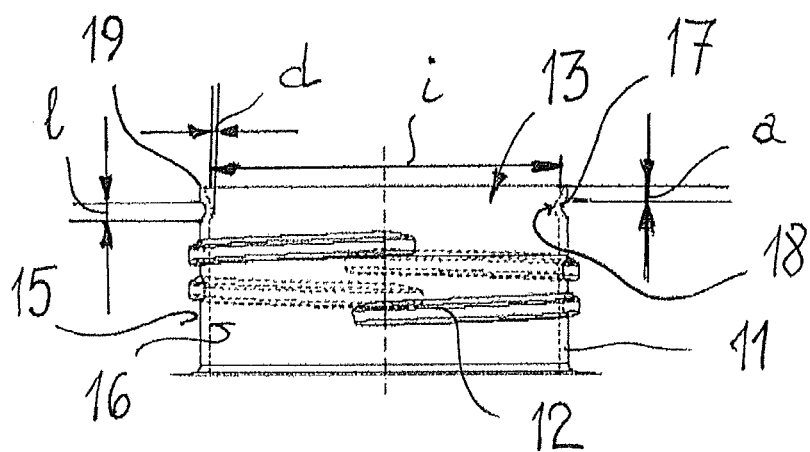
FIG. 2 shows an exemplary neck section of a stretch-blow-molded plastic container with a cut neck according to an exemplary embodiment of the disclosure.

In FIG. 2, the cut neck 11 of an exemplary stretch-blow-molded plastic container designed according to the disclosure is shown. The threaded sections formed in the stretch blow-molding method bear the reference number 12. The neck opening is provided with the reference number 13. The neck opening 13 has an inside diameter "I" that is larger than for example 30 mm and can be up to, for example, 150 mm or greater.

An encircling tapered portion in the form of a groove 17 is formed below the cutting periphery 19 of the cut neck 11 of the plastic container in its outside wall 15. The circumferential groove 17 has an axial distance "a" from the cutting periphery 19 of the cut neck 11, which is, for example, 1 mm to 10 mm. An axial length "l" of the groove 17, measured at the mouth of the circumferential groove 17 at the outside wall 15 is for example approximately 0.2 mm to 10 mm.

A circumferential sealing bead 18 that extends radially is formed on the inside wall 16 of the neck 11 as a result of the encircling circumferential groove 17 that is formed in the outside wall 15 of the neck 11 in the stretch blow-molding method. The circumferential sealing bead 18 that extends radially has a radially projecting length "d", relative to the inside wall 16 of the cutaway neck 11, which is for example approximately 0.2 mm to approximately 4 mm.

Figure 3:
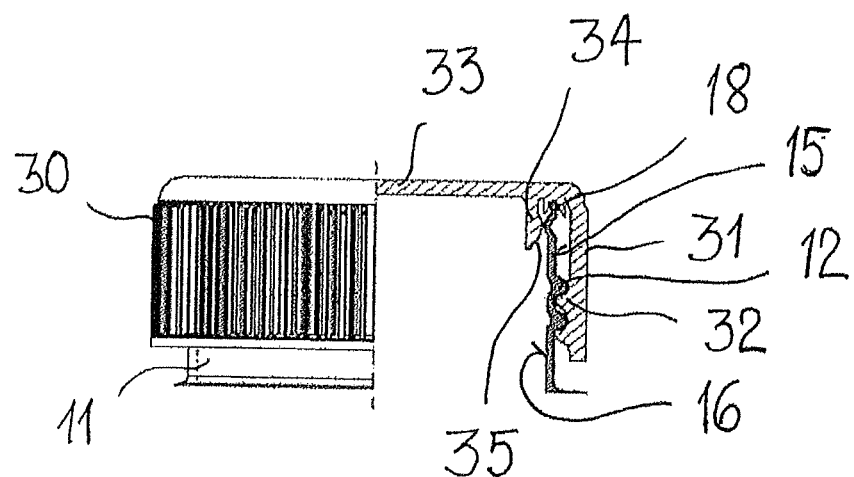
FIG. 3 shows a partially sectioned view of the neck of the plastic container according to FIG. 2, with a mounted closure part according to an exemplary embodiment of the disclosure.

FIG. 3 shows a partially sectioned view of the cut neck 11 of an exemplary plastic container, designed according to the disclosure, with a mounted closure part 30. The closure part 30 that is depicted is, for example, a screw closure. The latter has a potlike closure cap 31, on which inside wall an inside threading 32 is formed. The latter engages in the threaded turns 12 formed on the outside wall 15 of the cut neck 11.

A sealing cone 34 projects from the top surface 33 of the closure cap 31, which cone interacts, in the screwed-on condition of the closure cap 31, with the circumferential sealing bead 18 that projects radially relative to the inside wall 16 of the cutaway neck 11 and thus produces an inside sealing. The outside wall 35 of the sealing cone 34 in this case can be provided with a bevel such, that the sealing cone 34 slides along the circumferentially extending sealing bead 18 when the closure cap 31 is screwed on, and the pressure of the sealing bead 18 on the sealing cone 34 is increased with increasing screwing-on of the closure cap 31. As a result, a reliable sealing can be ensured.

Figure 4:
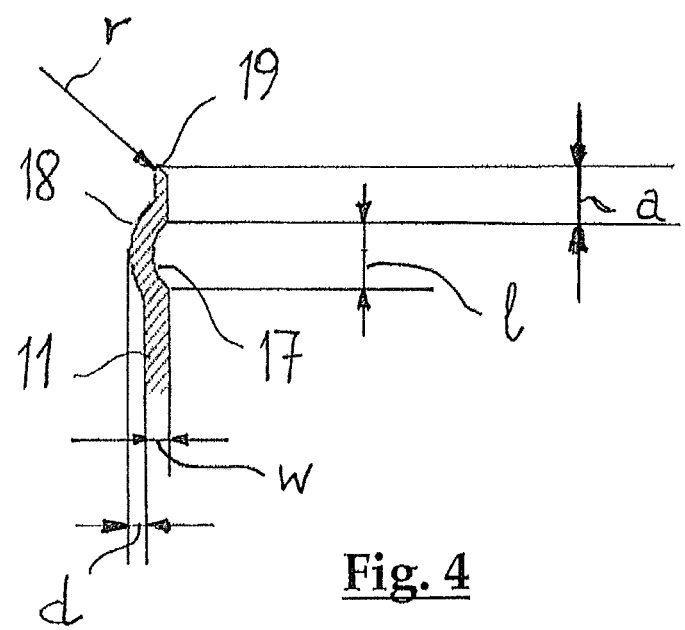
FIG. 4 shows an enlarged sectional view of the area of the cut neck according to an exemplary embodiment of the disclosure.

FIG. 4 shows a sectioned view of an end section of the exemplary cut neck 11 of the stretch-blow-molded plastic container. The encircling tapered portion, which is shaped as a circumferential groove, and which is produced in the stretch blow-molding method, again bears the reference number 17; the circumferential sealing bead that runs radially and that is a result of the encircling circumferentially running groove in the opposite wall is thus designated with the reference number 18.

The axial distance of the circumferential groove 17 from the cutting periphery 19 of the cut neck 11 is identified with "a". The axial length of the groove 17 is referred to with "l". The radial projecting length of the sealing bead 18 relative to the inside wall of the cut neck 11 bears the reference letter "d".

The circumferential sealing bead 18 that runs radially allows an inner sealing relative to a mounted closure part (FIG. 3). The cutting periphery 19 is not involved in the sealing and can therefore be optimized with respect to other specifications.

In an exemplary variant embodiment of the disclosure, the cutting periphery 19 of the cut neck 11 can have a radius of curvature (r) that is smaller than for example 0.2 mm. When the contents can be poured out, this sharp-edged design of the neck periphery 19 can ensure the "cutting-off" of the last drop and thus forms a so-called "dropless lip." The cutting periphery 19 of the cut neck 11 in this case can be cut in such a manner that it has a bevel that extends inwardly from the cutting edge.

The cutting periphery can also, however—as depicted in FIG. 4—be conducted in such a manner that the bevel of the cutting periphery extends outwardly.

In an alternative exemplary variant embodiment of a plastic container according to the disclosure, the edge 19 of the cut neck 11 has a radius of curvature (r) that is larger than for example 0.2 mm but smaller than for example 1.5 mm. Cutting peripheries with larger radii of curvature "r" can meet higher safety specifications, for example when it can be assumed that the contents of the plastic container can be enjoyed directly from the latter. The larger radius of curvature "r" in this case can provide for a better feel when the bottle edge comes into contact with the mouth.

The wall thickness of the cut neck 11 bears the reference symbol "w" and is, for example, approximately 0.6 mm to approximately 1.8 mm in the case of plastic containers that take the place of glass containers, which can be used, for example, for the storage of instant coffee, instant cocoa, instant tea, pickled gherkins or cocktail gherkins, cooking vegetables, and the like, mayonnaise, ketchup, breakfast spreads, spaghetti sauces, sauces of all types, mustard, horseradish, etc. If especially light plastic containers (bottles, boxes) are to be produced, the wall strength "w" of the cutaway neck 11 is, for example, approximately 0.2 mm to 0.6 mm.

Depending on the specifications of the plastic container, the latter can be made in one or more layers. Here, it can prove advantageous for the strength properties of the plastic container when at least one layer includes (e.g., consists of) a plastic or a plastic mixture of the group that consists of polyesters, polyolefins, polyamides, polystyrenes, polylactides and polyamides, for example PET, PE, PP, PEN, PVC, PVDC, and PLA. For the production of the preform in a plastic injection method or in a plastic flow molding method and for the subsequent forming of the plastic container from the preform in a subsequent stretch blow-molding method, it can be advantageous if at least one layer includes (e.g., consists of) mono-, bi- or polymodal HDPE or polypropylene.

For many applications of the plastic container, for example for the use in the food sector, it can prove advantageous when it is designed in multiple layers and has at least one layer with barrier additives, for example oxygen traps, nanoclays, or UV blockers and/or a slide coating and/or a residual discard coating. For ecological reasons, exemplary plastic containers according to the disclosure can include (e.g., consist of) up to 100% recycled plastic material (PCR plastics=Post Consumer Regrind plastics).

An exemplary plastic container with a large neck diameter, made in accordance with the disclosure, is suitable for example as a replacement for existing plastic bottles, whose neck is unnecessarily heavy, caused by the production of the underlying preform in the injection-molding method, or has experienced a thermal crystallization that is too low or that has undergone a certain amount of crystallization owing to stretching, and is therefore too soft or too heat-sensitive for the purpose provided. (For example, uncrystallized PET is already soft below an exemplary glass transition point of 70° C., while crystallized PET partially softens only at temperatures around the melting point of 250° C.)

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A plastic container, comprising:
   a body formed from a plastic preform, wherein the preform is formed through an injection molding process and is configured to establish a shape of the plastic container through stretch-blow molding;
   a neck produced from the plastic preform via a mold cavity of a blow-mold tool of a stretch blow-molding device, with a stretch mandrel used to form the shape of the plastic container; and
   a cut periphery of the neck, beneath which is an encircling, essentially radially tapered portion that encircles an outside wall of the plastic container and, on an opposing inside wall, forms a substantially radially encircling step, which step is configured for interaction with a sealing cone, which projects from a closure part, when mounted on the cut periphery of the plastic container,
   wherein the neck has a beveled edge at the cut periphery and the neck extends substantially in a vertical direction along an axial distance between the cut periphery and the encircling portion.

2. The plastic container according to claim 1, wherein the encircling tapered portion is at the axial distance from the cut periphery of the neck of approximately 1 mm to approximately 10 mm.

3. The plastic container according to claim 2, wherein the encircling step has a radially projecting length relative to the inside wall of the neck that is approximately 0.2 mm to approximately 4 mm.

4. The plastic container according to claim 3, wherein the encircling tapered portion extends over an entire length of the neck.

5. The plastic container according to claim 4, wherein the cut periphery has an inside diameter that is larger than 48 mm but does not exceed 150 mm.

6. The plastic container according to claim 2, wherein stretch-blow molding involves an axial and radial expansion of the preform.

7. The plastic container according to claim 1, wherein the encircling step has a radially projecting length relative to the inside wall of the neck that is approximately 0.2 mm to approximately 4 mm.

8. The plastic container according to claim 1, wherein the encircling tapered portion extends over an entire length of the neck.

9. The plastic container according to claim 1, wherein the encircling tapered portion is shaped as a circumferential groove running radially in the outside wall, which groove forms a sealing bead on the opposing inside wall.

10. The plastic container according to claim 9, wherein the circumferential groove has an axial length that is measured on the outside wall of the neck, which is approximately 0.2 mm to 10 mm.

11. The plastic container according to claim 1, wherein the cut periphery has an inside diameter that is larger than 48 mm but does not exceed 150 mm.

12. The plastic container according to claim 1, wherein the cut periphery has a radius of curvature that is smaller than 0.2 mm.

13. The plastic container according to claim 1, wherein the cut periphery has a radius of curvature that is larger than 0.2 mm but smaller than 1.5 mm.

14. The plastic container according to claim 1, wherein the neck has a wall thickness of approximately 0.6 mm to 1.8 mm.

15. The plastic container according to claim 1, wherein the neck on its outside wall has threaded turns, threaded sections or positive projecting lengths or recesses, which are formed by stretch blow-molding.

16. The plastic container according to claim 15, comprising:
at least one layer that consists of mono-, bi- or polymodal HDPE or polypropylene.

17. The plastic container according to claim 1, comprising:
one or more layers, with at least one layer that includes plastic selected from the group that consists of: polyesters, polyolefins, polyamides, polystyrenes, polylactides and polyamides.

18. The plastic container according to claim 17, comprising:
multiple layers, with at least one layer having barrier additives selected from the group consisting of: oxygen traps, nanoclays, UV blockers; and/or
a slide coating; and/or
a residual discard coating.

19. The plastic container according to claim 1, comprising:
up to 100% recycled plastic material.

20. The plastic container according to claim 1, filled with viscous contents.

21. A method for producing a plastic container, the method comprising:
forming a preform via plastic injection or plastic flow molding;
inserting the preform into a mold cavity of a blow-mold tool of a stretch blow-molding device, and with a blow-molding medium, inflating the preform by overpressure and stretching the preform with a stretch mandrel according to the mold cavity, to form the plastic container;
removing the plastic container from the mold cavity; and
cutting off an excess section that includes an injection-molded neck part of the preform to form a beveled edge, such that a neck of the stretch-blow-molded plastic container remains beneath a cut periphery after the cutting, the neck extending substantially in a vertical direction along an axial distance between the cut periphery and an encircling, which is essentially a radially tapered portion that encircles an outside wall of the plastic container and, on an opposing inside wall, the encircling forms a substantially radially encircling step configured for interaction with a sealing cone, which projects from a closure part, when mounted on the neck of the plastic container.

22. The method according to claim 21, wherein inflating and stretching the preform involves an axial and radial expansion.

* * * * *